United States Patent
Jaffe

(10) Patent No.: US 9,571,289 B2
(45) Date of Patent: Feb. 14, 2017

(54) METHODS AND SYSTEMS FOR GLITCH-RESISTANT CRYPTOGRAPHIC SIGNING

(71) Applicant: CRYPTOGRAPHY RESEARCH INC., San Francisco, CA (US)

(72) Inventor: Joshua M Jaffe, San Francisco, CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 14/441,998

(22) PCT Filed: Nov. 11, 2013

(86) PCT No.: PCT/US2013/069454
§ 371 (c)(1),
(2) Date: May 11, 2015

(87) PCT Pub. No.: WO2014/075000
PCT Pub. Date: May 15, 2014

(65) Prior Publication Data
US 2015/0288524 A1 Oct. 8, 2015

Related U.S. Application Data

(60) Provisional application No. 61/725,058, filed on Nov. 12, 2012.

(51) Int. Cl.
*G06F 21/00* (2013.01)
*H04L 9/32* (2006.01)
(Continued)

(52) U.S. Cl.
CPC ............. *H04L 9/3247* (2013.01); *H04L 9/004* (2013.01); *H04L 9/14* (2013.01); *H04L 9/3252* (2013.01);
(Continued)

(58) Field of Classification Search
CPC ...................................... H04L 9/3247
See application file for complete search history.

(56) References Cited

U.S. PATENT DOCUMENTS 7,177,424 B1* 2/2007 Furuya .................. H04L 9/0618
380/259
8,644,510 B2* 2/2014 Cakulev ................ H04L 9/0894
380/255
(Continued)

FOREIGN PATENT DOCUMENTS

EP 1050133 A1 11/2000

OTHER PUBLICATIONS

Pornin, "Deterministic Usage of DSA and ECDSA Digital Signature Algorithms draft-pornin-deterministic-dsa-01", Internet Engineering TAsk Force, Aug. 27, 2012.*

(Continued)

*Primary Examiner* — Morshed Mehedi
(74) *Attorney, Agent, or Firm* — Finnegan, Henderson, Farabow, Garrett & Dunner, LLP

(57) ABSTRACT

Methods and devices disclosed herein use techniques to resist glitch attacks when computing discrete-log based signatures. The methods and systems described herein replace the random nonce in conventional signature systems with a pseudorandom nonce derived in a deterministic way from some internal state information, such as a secret key or a counter, such that the nonce is not repeated. The methods and systems described herein may also use tests to verify that a glitch has not occurred or been introduced.

17 Claims, 9 Drawing Sheets

(51) Int. Cl.
　　　*H04L 9/00*　　　(2006.01)
　　　*H04L 9/14*　　　(2006.01)
(52) U.S. Cl.
　　　CPC ........ *H04L 2209/24* (2013.01); *H04L 2209/72* (2013.01)

(56) References Cited

U.S. PATENT DOCUMENTS

| | | | | |
|---|---|---|---|---|
| 2002/0073322 | A1* | 6/2002 | Park | H04L 9/3271 713/188 |
| 2007/0286416 | A1* | 12/2007 | Bertoni | H04L 9/0631 380/37 |
| 2010/0098247 | A1* | 4/2010 | Suumaki | H04L 9/0866 380/44 |
| 2011/0138192 | A1* | 6/2011 | Kocher | G06F 21/602 713/189 |
| 2012/0084565 | A1* | 4/2012 | Wittenberg | H04L 9/3213 713/172 |

OTHER PUBLICATIONS

CN Office Action dated Jul. 10, 2015 in CN Application No. 2013900008712. 6 pages (with translation).
PCT International Search Report and Written Opinion dated Mar. 18, 2014 in International Application No. PCT/US2013/069454. 10 pages.
Pornin, T., "Deterministic Usage of DSA and ECDSA Digital Signature Algorithms," Aug. 27, 2012, draft-pornin-deterministic-dsa-01, Internet Engineering Task Force. 80 pages.
CN Office Action dated Dec. 30, 2015 in CN Application No. 2013900008712. 4 pages (With Translation).
CN Response to CN Office Action on Nov. 24, 2015 for CN Appln. No. 2013900008712. 21 Pages. (With Translation).
EP Response with EP Appln. No. 13812218.9 filed on Jan. 20, 2016 in Response to the Official Communication of Jul. 21, 2015. 13 Pages.

* cited by examiner (ECDSA/DSA)**

METHODS AND SYSTEMS FOR GLITCH-RESISTANT CRYPTOGRAPHIC SIGNING

BACKGROUND

Systems that operate on sensitive data need to protect against unauthorized access to, or disclosure or alteration of, such data. Digital signatures can be used to attest to the integrity and authenticity of sensitive data. Tamper resistant cryptographic devices used to sign sensitive data may be used in environments where attackers can gain physical access to the device. Attackers who gain access to cryptographic keys and other secrets could generate counterfeit data, forge signatures or steal or otherwise tamper with the sensitive data, leading to severe consequences such as the subversion of critical operations of the system and exposure of confidential or proprietary information or expose unintended access to a physical resource.

In a "fault attack," an attacker deliberately attempts to modify some aspect of a device or its environment in the hopes of introducing an error or fault ("glitch") into an operation and gaining access to secret keys. Some non-transient fault attacks use a focused ion beam station to physically modify a device circuit. Transient faults are not intended to permanently modify the target device. Some of the best known transient fault injection techniques include introducing variations into a supply voltage, clock frequency, temperature, or blasting a circuit with a laser or other pulse of light.

Faults can have many effects. They can cause a step in a computation to be skipped. They can cause a step to be repeated. They can cause one operation to be substituted for another. They can modify a value in a memory or traversing a bus—for example, changing the address from which data or instructions are loaded. They can cause a value to be zeroed, or set to some other value. Such faults can lead to a cryptographic operation mixing a partially correct result with a partially corrupted state. Many faults are exploited by analyzing partially corrupted states.

Another type of attack depends on a transient fault that disrupts one type of computation but has no impact on another. For example, a certain physical glitch might kill operations of type "A", but have no impact if triggered during an operation of type "B". Observing which time locations are "safe", i.e. do not affect the result of the computation, allows an attacker to infer locations of the operations "B" which may in turn compromise the security.

Many countermeasures for preventing fault attacks have been developed. Some approaches are based on adding additional circuits to detect faults. Other approaches randomize the clock to make landing precisely-timed glitches harder. Duplicate circuits can perform a calculation twice; a fault in one circuit that leads to a difference in result may be detected. Software techniques involve performing additional verification steps, or implementing cryptographic algorithms to resist or detect faults. For example, one early countermeasure involved simply performing the calculation twice (perhaps using two different implementations) and confirming that the results are the same. Another approach is to perform a calculation such as decryption and then a corresponding inverse operation such as encryption and confirm that the output of the inverse operation is equal to the initial input before further processing the decryption result. Signature systems (including DSA) can check the signature result by performing a public key verification. This is particularly efficient for RSA, where checking the signature is much faster than calculating it (in contrast to DSA, where the public key verification is much slower than signing). This public key verification step confirms that the signature does indeed correspond to the message (or message hash) being signed. Notwithstanding, in a DSA system the public key verification step does nothing to prove that the nonce has not been reused or that it has not otherwise been tampered with.

Many countermeasures specific to RSA-CRT have been proposed, including some that expand some of the moduli used in the calculations in a way that allows a quick "sanity check" to be implemented using a few extra reductions. Still others attempt to implement cryptographic algorithms in a "fail safe" manner—i.e. where a faulty output is not helpful in recovering the secret key.

However, digital signature systems based on the discrete log problem (such as, for example ElGamal Signature Algorithm, Digital Signature Algorithm (DSA), and the elliptic-curve counterparts) are based on significantly different principles than RSA-CRT, and are subject to additional glitch attacks. For example, DSA signature systems use a random unique value (nonce) to secure each signature. The security of DSA requires that these nonce values remain secret, and never be reused. An attacker who collects n signatures can use them to construct n equations in (n+1) unknowns. If a nonce is reused or if a nonce's value becomes known then the system of n equations has only n unknowns, and the attacker can use standard algebraic methods to solve for the private key, d, also called the signing key. Fault attacks against devices employing these algorithms can succeed by introducing a "fault" or "glitch" in the operation of the device that causes a nonce value to be reused. Other fault or glitch attacks may cause a nonce to be forced to a known value, or an unknown value that is used multiple times. Still other fault or glitch attacks may cause one of the operations to be skipped during the modular exponentiation (or curve multiplication). Other faults may cause a multiplication or reduction not to take place in a later stage of the computation.

Because nonce values need to be unique for each message, confirming that a DSA signature corresponds to the message (hash) being signed does not prove that no compromising fault has taken place.

BRIEF DESCRIPTION OF DRAWINGS

The accompanying drawings, which are incorporated in and constitute a part of this specification, together with the description, serve to explain the principles of the embodiments described herein.

FIGS. 3A-1 and 3A-2 illustrate another exemplary embodiment in which the glitch-resistant cryptographic signing method of FIG. 3 is combined with a counter verification process.

DETAILED DESCRIPTION

Figure 1:
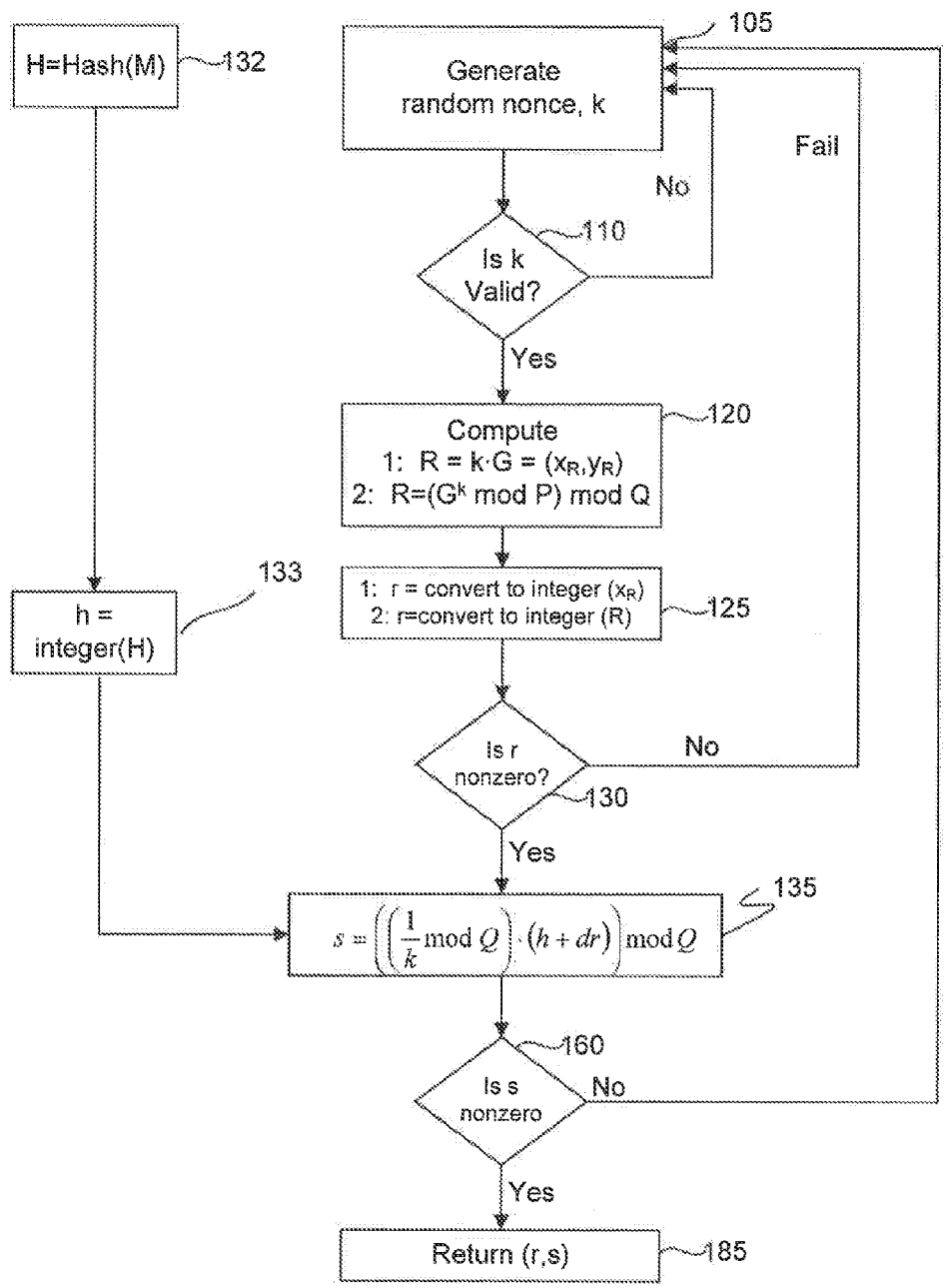
FIG. 1 is a flowchart showing how to generate a signature for message M using the standard elliptic curve digital signature algorithm (ECDSA) or Digital Signature Algorithm (DSA).

Reference will now be made in detail to exemplary embodiments as illustrated in the accompanying drawings. Wherever possible, the same reference numbers will be used throughout the drawings and the following description to refer to the same or like parts. These embodiments are described in sufficient detail to enable those skilled in the art to practice the invention and it is to be understood that other embodiments may be utilized and that changes may be made without departing from the scope of the present invention. The following detailed description, therefore, is not to be taken in a limited sense.

Methods and devices disclosed herein use techniques to resist and detect glitch attacks when computing discrete-log based signatures. As discussed above, digital signature systems based on the discrete log problem use a unique random value (also called a nonce) to generate a signature. A primary vulnerability in these systems is the use of a known nonce, or reuse of a nonce with two or more different messages. The methods and systems described herein produce nonces in a way that resist reuse attacks. Some embodiments incorporate tests to verify that a particular signature does indeed correspond to a particular value of the nonce. Some embodiments introduce structure into a nonce (i.e. deriving all or a portion of the nonce from a secret key or a counter using a pseudo-random process). Because any sort of predictability in a nonce can lead to a cryptographic weakness in a signature scheme, some aspects of these embodiments incorporate various novel approaches to derive a nonce whose form can be verified without causing the nonce value to be predictable to an attacker. Before transmitting a potential signature, some embodiments implement multiple tests to ensure that it does not compromise the system. Some embodiments perform tests on a prospective signature that make use of the private signing key (or its inverse) in the verification step. Some embodiments perform tests on a prospective signature that involve using the nonce (or its inverse).

The approach taken in some embodiments described herein is to perform tests that complement a public key verification (i.e. that confirm the same cryptographic properties of the signature and message), but that make use of knowledge of the secret key in order to achieve significantly faster performance. To enable some of these tests, some embodiments described herein introduce structure into the way that nonces are derived, allowing the signing device to evaluate a random looking number and determine whether it actually corresponds to an expected value for the current nonce.

In some embodiments, a portion of the nonce is generated using the value of a counter. Storing a counter in memory requires less space than storing a complete set of previous nonces. The nonce derivation process uses a function that mixes or scrambles (enciphers) the counter to produce an unpredictable output. The scrambling process may be based on a secret primitive, or may make use of a keyed cryptographic process (such as a block cipher or a hash function in a MAC construction). In some embodiments the cryptographic process uses DPA countermeasures. In some embodiments the MAC construction is structured to resist DPA—for example as described in copending U.S. Patent Publication No. 2011/0138192 by Paul Kocher, Pankaj Rohatgi, and Joshua M. Jaffe titled "Verifiable, Leak-Resistant Encryption and Decryption." To increase unpredictability (and therefore security), some embodiments described herein use a keyed cryptographic process (such as AES decryption with a secret key, or HMAC-SHA) to derive the portion of the nonce, while others may make use of a hash tree that is resistant to differential power analysis (DPA).

Many embodiments of the invention derive nonces from a counter using a function that is reversible. The nonce is generated from a counter, and then used to generate a signature. In more secure embodiments, the counter is updated and stored in a memory prior to deriving the nonce; in others, the counter is updated after the nonce is derived. Some of these embodiments then perform a verification step that involves taking a prospective signature, manipulating its components by performing a sequence of operations to check the nonce that involves mixing the private key with the prospective signature to recover a derived nonce, then taking the derived nonce and applying an inverting function then checking to see whether the result of the inverting function includes the expected value of the counter.

Some embodiments of the invention derive nonces from a counter using a function that is not reversible. These embodiments may use a cryptographically secure pseudo-random number generator to derive the nonce from the value of the counter. In some embodiments, nonces are generated randomly and a database of all previously used nonces is maintained. Prior to completion of a signature, a nonce is added to the database and if a reuse is detected, the nonce is rejected and the signature process is restarted.

In some embodiments, the value of the derived nonce is stored, and the stored value can be compared to a value subsequently put to use. In some embodiments, a modular inverse of the nonce is used during the signature process, and the value of the nonce can be stored or re-derived and verified after this modular inverse has been computed. In some embodiments the process of deriving the nonce can be performed two or more times. In some embodiments the value of the nonce is re-derived during a verification step, and used to confirm that the value of a "check nonce" computed from the signature does indeed correspond to the expected counter.

Some countermeasures focus on detecting actions that cause the multiplication by 1/k to be skipped, or that cause something other than 1/k (i.e. a known, or reused value) to be used in the derivation of r. This includes glitches that interfere with the computation of the inverse of k as well as for example an address-line glitch that might cause a different (constant) value to be read from memory during the computation of r. Still other countermeasures are designed to detect faults that may have interfered with the reduction(s) modulo Q.

Some verification steps confirm that the signature corresponds to the particular nonce. Others confirm that the nonce has a particular structure that prevents collisions.

Embodiments herein may use a key to derive nonce values from a counter. In some embodiments, DPA countermeasures may be used to protect the use of each static key in the system. (As described herein, the "static keys" include the nonce derivation key and the private signing key. In some embodiments, these keys may be the same.)

As described in more detail below, the methods and systems described herein are suitable for use with all discrete-log and elliptic curve (EC)-based signature systems. While exemplary embodiments may be described in the context of one particular discrete-log or EC-based signature algorithm, the same principles may be used in others.

This disclosure assumes a detailed understanding of the DSA, also known as the Digital Signature Standard (or DSS), which is defined in "Digital Signature Standard (DSS)," Federal Information Processing Standards (FIPS) Publication 186-3, National Institute of Standards and Technology, June 2009, and described in detail in the Handbook of Applied Cryptography by Menezes et al. (CRC Press, Inc., 1997), pages 452 to 454. It is also assumed that one of skill in the art would know and understand the elliptic curve variant of DSA (ECDSA) also described in FIPS 186-3, and many other resources such as "Guide to Elliptic Curve Cryptography" by Hankerson, Menezes and Vanstone, pp 183-186, and IEEE 1363, Standard Specifications for Public-Key Cryptography, 2000. Any descriptions of standard DSA, ECDSA, or other signature algorithms provided herein are not meant to be comprehensive, that is, a full description of the algorithm but rather a description of only those steps relevant to or helpful for understanding the inventions described herein. The inventions also apply to other digital signature standards similar in nature such as IEEE p1363, PKCS#11, KCDSA, Nyberg-Rueppel, El Gamal, Schnorr, etc.

Elliptic Curve/Digital Signature Algorithm (ECDSA)

FIG. 1 is a flowchart for generating a signature for message M using the standard ECDSA (Equation #1 in box 120) or DSA (Equation #2 in box 120). At some point, a hash (H) of message M is generated as shown in step 132. The hash function is generally chosen by the signature system being employed, for example, NSA chose SHA-256 and SHA-384 (described in FIPS 180-3) for their Suite B set.

Common notation used for DSA and ECDSA varies depending on what standard or publication you are reading; in this document we will adhere to the notation used in FIG. 1. In DSA and ECDSA, a key pair, (d, Y), consists of a private key d and a public key Y. Each system also includes a number of domain parameters. These domain parameters may be defined by a standards body or by the application to which the signature system will be deployed. They may also be considered part of the public key.

In ECDSA, the domain parameters include a description of the curve, a point G that is on the curve, and an integer Q that is the order of the group of points on the curve that can be generated by multiplication from G. The key pair d, Y and the domain parameters are mathematically related to each other via the relation $Y = d \cdot G$, where $d \cdot G$ indicates the elliptic curve scalar multiply of point G by scalar d. In DSA, the domain parameters include a prime P, a base G, and an integer Q that is the order of the group of numbers modulo P that are generated by powers of G. The key pair is also mathematically related to the domain parameters, via the relation $Y = G^d \mod P$ (i.e. Y is congruent modulo P to the value of base G raised to the exponent d).

To generate a signature for the message M using ECDSA or DSA, in step 105, a new nonzero secret random number, k, also called a "nonce," is generated. The random number, k, and its inverse modulo Q, $k^{-1}$, are integers in the range 1 to Q-1. It is expected that the selection of k will have a uniform distribution throughout the defined interval.

In step 110, a test is performed to determine if the generated nonce, k, is valid; that is, if k is greater than zero and less than Q. If k is not valid, the process returns to step 105 and another value of k is generated. If k is valid, in step 120, the nonce, k, is used to compute the first portion of the digital signature. In ECDSA (Equation #1), R is determined by generating the elliptic curve point $X = k \cdot G = (x_R, y_R)$ where G is the seed point of the elliptic curve. In DSA (Equation #2), R is calculated as $R = (G^k \mod P) \mod Q$.

In step 125, the first portion of the digital signature, r, is generated. In ECDSA, R is a point on the curve, and r is generated by converting its x coordinate ($x_R$) to an integer modulo Q. In DSA, R is already an integer modulo Q, and is re-labeled r for notational symmetry with the ECDSA case.

In step 130, a test is performed. If r is zero, it is not used, and the process returns to step 105, and a new k is generated.

If r is nonzero, the second portion of the digital signature, s, is generated as in step 135, with $$s = \left(\left(\frac{1}{k} \mod Q\right) \cdot (h + dr)\right) \mod Q,$$

where h is a hash of the message, M, converted to an integer from H(M) as shown in step 133. In step 160, the value of s is checked. If s is zero, s is not used, and the process returns to step 105 and a new k is generated.

If s is nonzero, the signature components (r, s) will be returned (step 185) for use in signing the message, M.

It should be noted that in some implementations of DSA and ECDSA, the checks on r (step 130) and s (step 160) are omitted. In some implementations, the test on the nonce, k, (step 110) may be a check to see if k is greater than 1. Further, some cryptographic devices that perform signature processes similar to DSA leave out the step of computing the hash and may require that the input to be signed be an integer of the appropriate size to be a hash.

Signature Generation with Pseudorandom Nonce

Disclosed herein are methods and devices for determining that certain glitches have not occurred which may compromise a digital signature.

In some embodiments, tests are performed to determine that the nonce and resulting signature are correct, that is, that the nonce has not been reused or forced to a value that an attacker could guess. Methods and systems disclosed herein may verify the signature, and that the generated signature actually corresponds, and was generated using, the generated nonce.

In some embodiments, the random nonce is replaced with a pseudorandom nonce. Pseudorandom nonces may also be referred to as "structured" nonces, because part of the security involves verifying that the nonce used was produced according to a particular derivation structure. The nonce is generated in ways that leave it unpredictable to an attacker, but capable of being regenerated by the device.

In some embodiments, the nonce may be derived from some internal state information in a deterministic way, such that generation of the nonce may be repeated. The methods and systems described herein also update internal state information in a way that provides high assurance that the sequence of derived nonce values will be unique. To increase security, nonce-generation should be uniform across the modular field.

The principles described herein may be applied in a wide variety of methods for signature generation, as shown in the following exemplary embodiments.

Figure 2A:
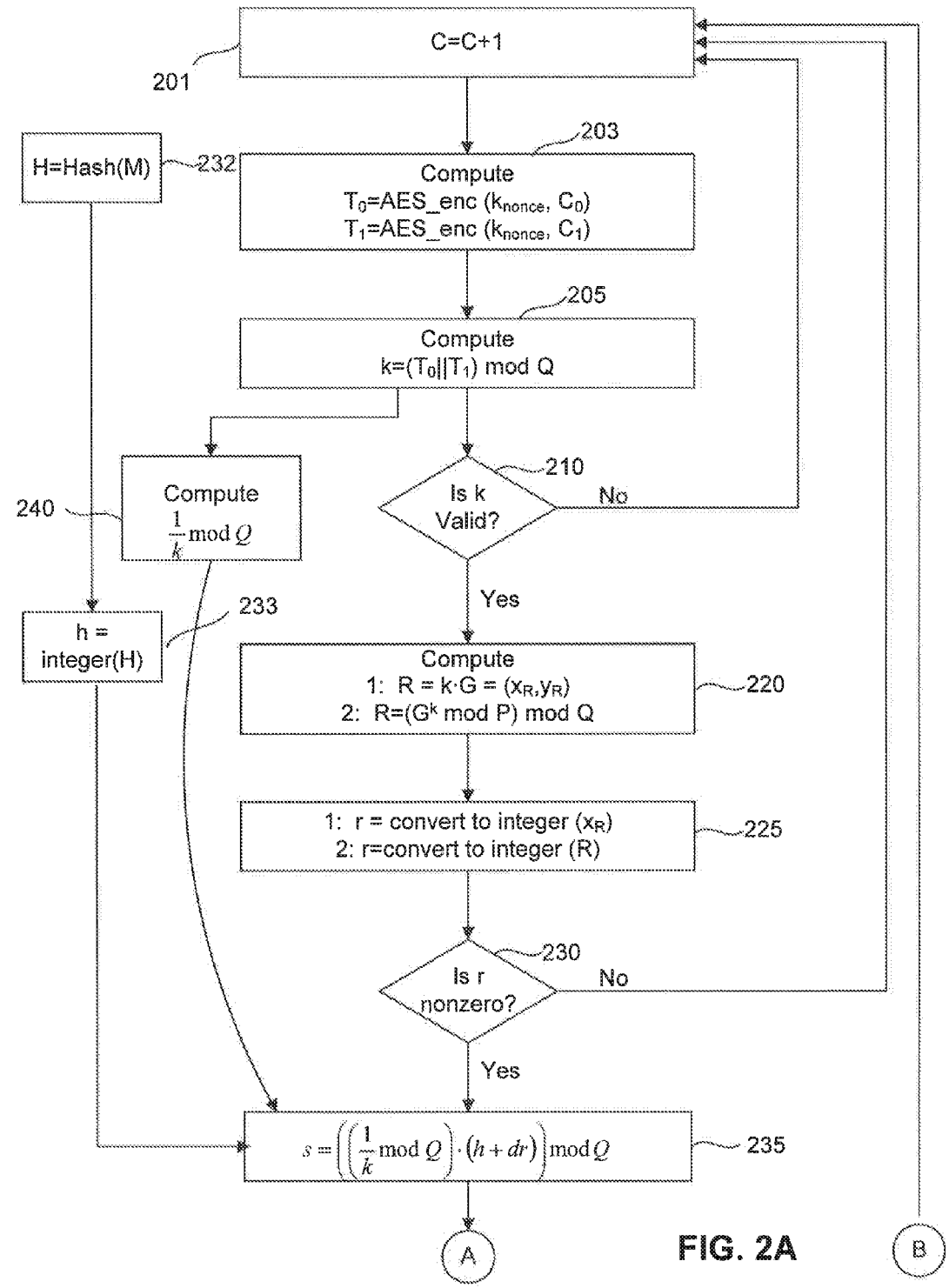
FIGS. 2A and 2B are a flowchart showing a method for generating a signature using ECDSA or DSA and modified based on the principles of the embodiments described herein.
Figure 2B:
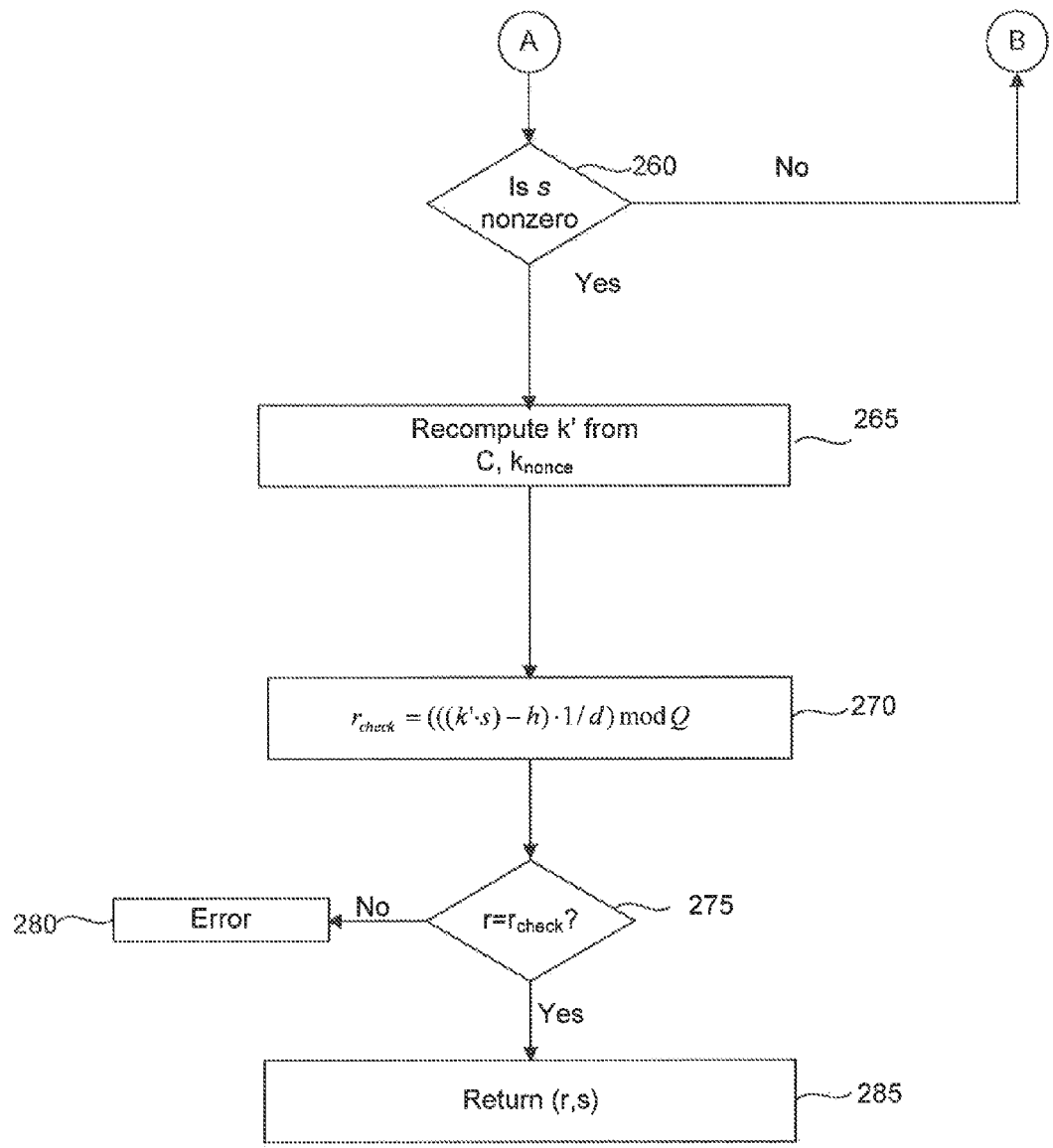

FIGS. 2A and 2B show an exemplary method for generating a digital signature using a pseudorandom nonce consistent with the principles described herein. As shown in FIG. 2A, a counter, C, is used to generate k. A "counter" can refer to any value stored in a memory that is updated in a sequence that contains a nontrivial number of elements, and in which a "final value" may be recognized. In some embodiments, the counter may be generated, for example, by a Linear Feedback Shift Register (LFSR). The counter may be any suitable length, however, in many embodiments using a counter that is 64 bits or larger increases uniformity and reduces collisions. Using a counter guarantees that the sequence of nonces will not have a short cycle, but it does not guarantee that there will be no collisions modulo Q. The value of the counter need not be secret, though it is essential that its value be updated between signatures. Atomic memory writes are one approach for ensuring that a value has been updated. Tests before and after an atomic memory write may be used to ensure that it has succeeded.

In step 201, the counter is updated at the start of the signature generation process. In certain embodiments, the counter is updated with an atomic write and the result verified before continuing. The counter is updated here in order to guarantee that the counter used for the current signature has not been used before. In certain embodiments, the counter may be updated at the end of a previous signature generation process with the same effect.

In step 203, temporary values, $T_0$ and $T_1$, are computed using the counter, C, and any suitable encryption algorithm. One suitable encryption algorithm is the Advanced Encryption Standard (AES), a FIPS-approved symmetric block cipher, which is capable of using cryptographic keys of 128, 192, and 256 bits to encrypt. Using AES, $T_0$ is computed as $T_0$=AES_enc($k_{nonce}$, $C_0$) while $T_1$ is calculated as $T_1$=AES_enc($k_{nonce}$, $C_1$). In some embodiments, the values $T_0$ and $T_1$ are stored prior to the modular reduction. In step 205, the temporary values are used to compute the pseudo-random nonce, k, which is calculated as k=($T_0$||$T_1$)mod Q.

In many embodiments, the input to the modular reduction (i.e. $T_0$||$T_1$) should be larger than Q to avoid bias. As mentioned above, bias may be reduced by choosing a counter of sufficient length such that $T_0$||$T_1$ is at least 64 bits larger than Q. In this example, $T_0$||$T_1$ is 256 bits long, so the length of the input exceeds the length of Q by 96 bits.

While the process in FIG. 2A is illustrated using $T_0$ and $T_1$, any number of intermediate temporary values may be calculated from the counter before the nonce, k, is determined. The multiple temporary values can be combined or concatenated so long as the result is reduced modulo 0 to form the pseudorandom nonce, k. For example, the nonce k may be calculated as follows:

$C=C+1$ $T_0$=Hash($k_{nonce}$||$C_{bit0}$||$C_{bit1}$)

$T_1$=Hash($T_0$||$C_{bit2}$||$C_{bit3}$)

...

$T_m$=Hash($T_{m-1}$||$C_{bit(2-m)}$||$C_{bit(2m+1)}$)

$k=(T_m)$mod $Q$ where the output size of the hash function is sufficiently larger than Q.

In general, in embodiments described herein, steps 201-205 of FIG. 2A may replace step 105 of FIG. 1 in any signature generation method. Thereafter, steps 210-260 of FIG. 2A and FIG. 2B may be performed as in steps 110-160 of FIG. 1, using the specially-computed value k and the other EC parameters. In addition, in some embodiments, the inverse of k modulo Q as computed in step 240 is optionally stored in memory. This value may be used later in a consistency check to assist in determining if a glitch has occurred.

Returning now to FIGS. 2A-2B, embodiments described herein guard against glitches by computing a check value to compare to the signature value. In step 265, the nonce, k, may be recomputed from the counter, C, a value referred to as k'.

In step 270, $r_{check}$ may be computed as follows:

$$r_{check} = \left(((k' \cdot s) - h) \cdot \frac{1}{d}\right) \bmod Q \text{ (step 270)}$$

and compared with the earlier-computed signature component, r (step 275). If the two values are equal ($r=r_{check}$), there is a high degree of confidence that no glitch has occurred. The signature components (r,s) may be returned for use in signing message, M. If, however, $r_{check}$ does equal r, an error (or glitch) has occurred or been intentionally introduced (step 280). In this case, the process can signify the error by, for example, returning an error code or incrementing a failure counter, and/or restarting this signature process at step 201.

It should be recognized that $r_{check}$ may be calculated in other ways. For example, in some embodiments, $r_{check}$ may be calculated as:

$$r_{check} = \left((((T_0||T_1) \cdot s) - h) \cdot \frac{1}{d}\right) \bmod Q.$$

Speed and/or efficiency may be increased in some applications by performing the calculations in a different order that is mathematically equivalent. Also, in certain embodiments, the inverse of d may be pre-computed and stored. Storing this value allows the algorithm to avoid having to calculate 1/d in each or any iteration of the signature generation algorithm. It also may be used as an additional consistency check, for example by checking that $$1 = \left(d \cdot \frac{1}{d}\right) \bmod Q.$$

In some embodiments, the nonce k can be generated as a function of multiple inputs, such as a function of a counter and a random number. In the following example, for example, V may be a random 256-bit number. The pseudorandom number, k, may be generated as follows:

$k=((T_0||T_1) \cdot (V+2^{256}))\bmod Q$

In this embodiment, however, V will need to be stored in order to be able to regenerate k or check values.

Figure 3:
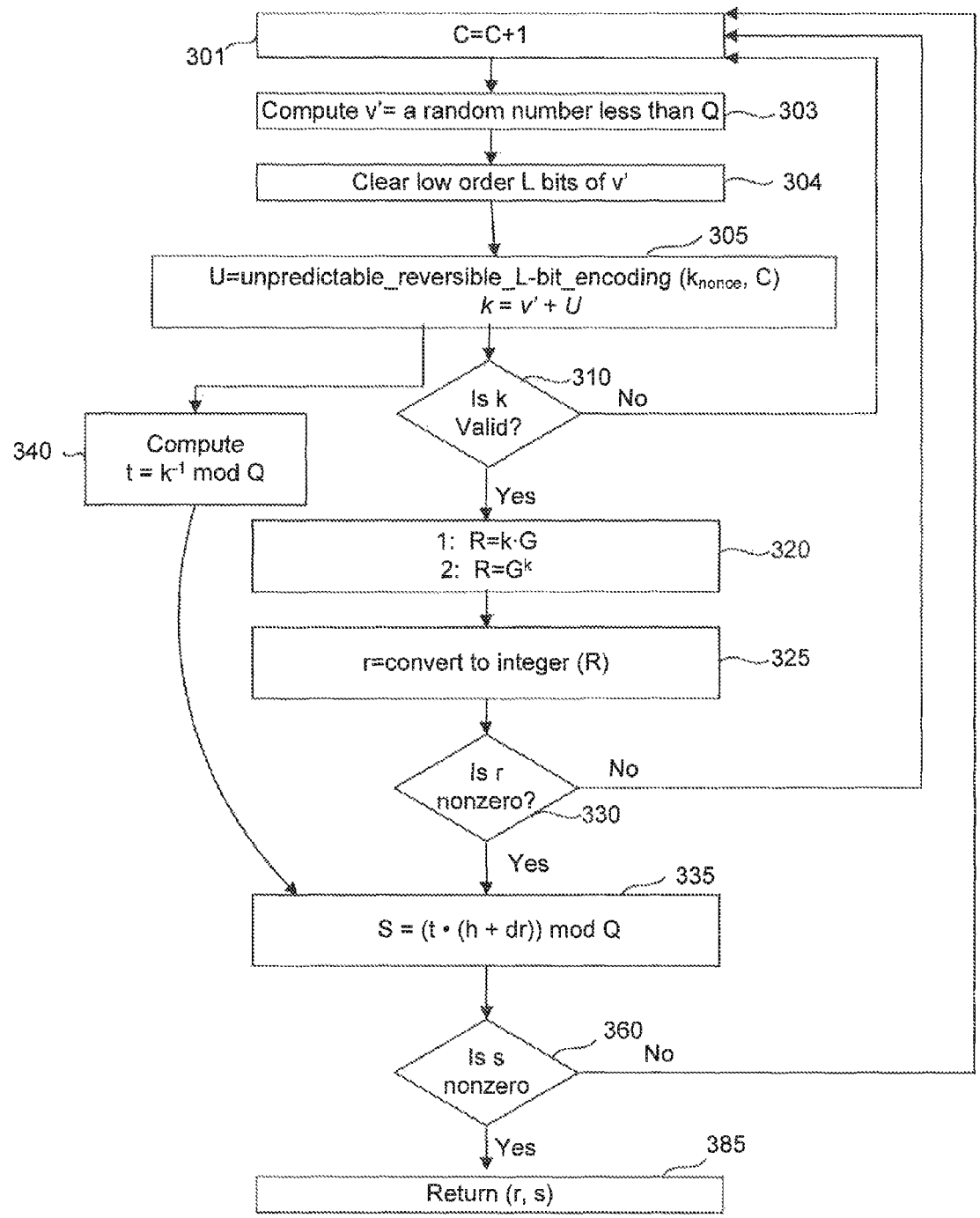
FIG. 3 is a flowchart of an exemplary embodiment based on ECDSA or DSA, in which the nonce may be derived from a counter and a secret constant using a reversible function, such as AES.

FIG. 3 illustrates an exemplary embodiment of a glitch-resistant cryptographic signing method, in which the nonce may be derived from a counter and a secret constant using a reversible function, such as AES. While FIG. 3 is illustrated with respect to ECDSA and DSA, the principles may be applied to other discrete log signature algorithms. In FIG. 3, the nonce may be calculated as follows.

In step 301, the counter is updated. As mentioned above, it is essential that a fresh counter be used in each signature generation. The updating of the counter may occur, for example, immediately prior to returning a signature, or at the very start of the signature generation process. (The counter should also be updated whenever the process returns to the beginning as may occur in step 310, 330, 360, and 380, etc.) For this example, the counter is updated at the beginning of the signature generation. In step 303, a random number v' is obtained that is less than Q. Often this number is uniform—or nearly uniform—over the range from 1 to Q–1. For example, some embodiments generate a random binary number v" that is at least 64-bits larger than Q, and reduce v" modulo Q to obtain v'.

In step 304, some number (L) of low-order bits of v' are set to zero, producing a re-labeled variable v.

In step 305, an L-bit quantity U is generated from the counter, using a secret key $k_{nonce}$ and a reversible function that produces an output that is intended to be hard to predict, given knowledge of C, by attackers who do not know the value of $k_{nonce}$. An example of such a function is a block cipher with L-bit output (i.e. AES would work for L=128, and DES would be suitable for L=64). In the embodiment shown in FIG. 3A-1, U may be computed as U=AES_enc ($k_{nonce}$, C).

In the AES example, the lowest order 128 bits of v' may be set to zero by performing the following operation: v=v'–(v' mod $2^{128}$), but setting a number of bits in a memory to zero is a trivial operation that does not usually require subtraction and modular arithmetic.

Then the nonce k may be generated by combining the high-order bits of v' (i.e. v) with the L-bit output U: for example, by adding v to U. Alternatively, the nonce k can be created by combining all but L bits of v' with the bits of U, without zeroing, etc. In either case, all of these discrete log-based signature systems can be compromised if a significant enough bias is present in the nonce. Although taking a number that is uniform modulo Q and replacing some of its bits with a binary number will introduce some bias, this bias will be exceedingly small if L is sufficiently shorter than Q. (In many cases, for example, the bias will be on the order of $2^{-(lg(Q)-L)}$.) It is common to generate numbers that are "basically uniform" modulo Q by taking a random binary number that is 32 or 64 bits longer than Q and reducing it modulo Q. In practice, taking a number that is uniform modulo Q and replacing all but the high-order 32 or 64-bits with random bits will be "basically uniform" with an equivalent level of bias.

In step 340, compute a variable t equal to the inverse of nonce k modulo Q. This value may be stored for later use.

In step 310, a check may be performed on the pseudo-random nonce, k, to determine if the generated nonce, k, is valid, that is, if k is greater than zero and less than Q. If k is not valid, the process returns to step 301. The counter is updated and another value of k is generated. If k is valid, in step 320, the nonce, k, is used to compute the first portion of the digital signature, R.

In step 325, R is converted to an integer, r. If r is zero (step 330), the process returns to step 301 and computes another nonce, k. If r is nonzero (step 330), the process continues on to determine the second portion of the digital signature, s, in step 335, as shown below.

$$s = \left(\frac{1}{k} \bmod Q\right) \cdot (h + d \cdot r) \bmod Q$$

Figures 1, 3A:
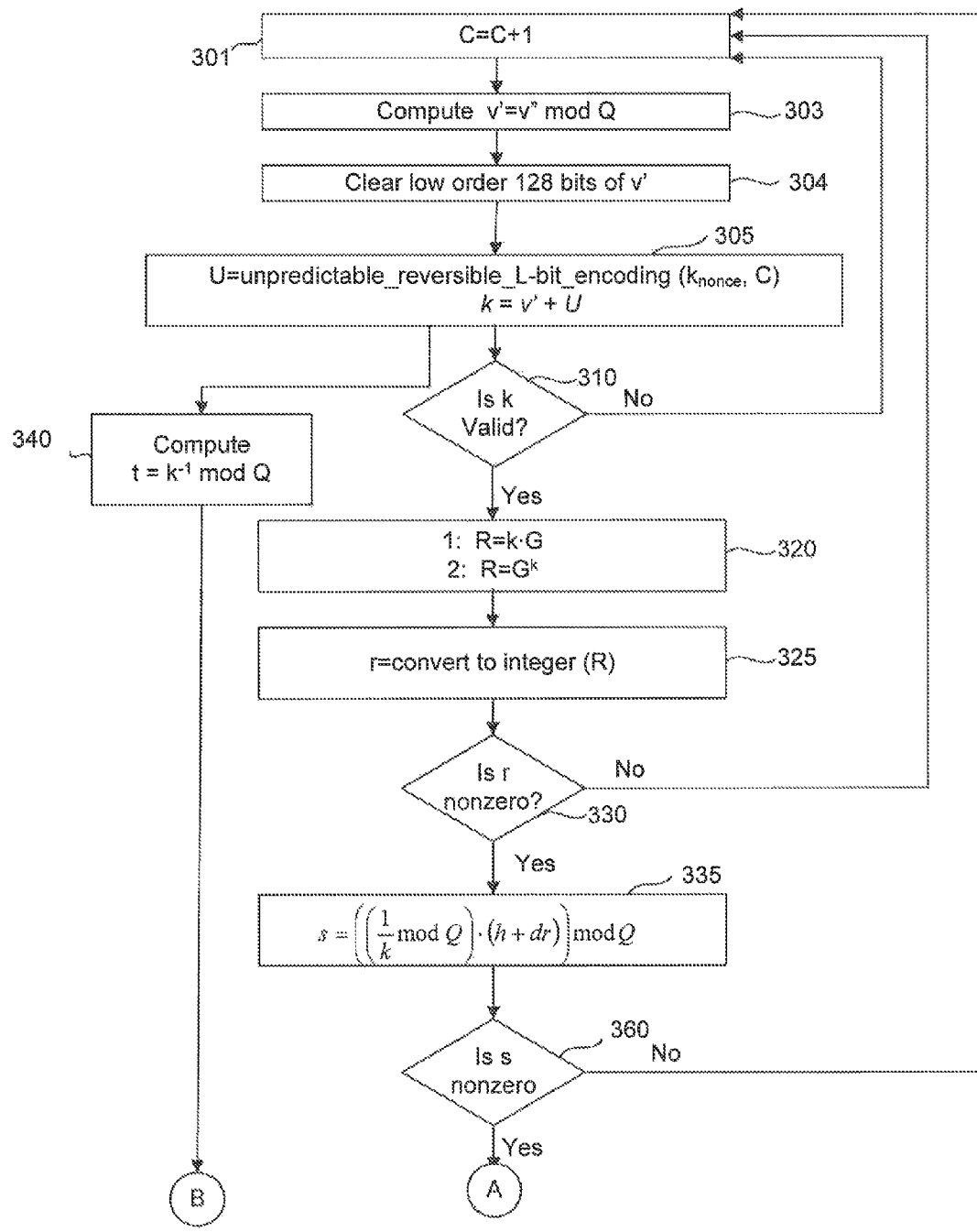
Figures 2, 3A:
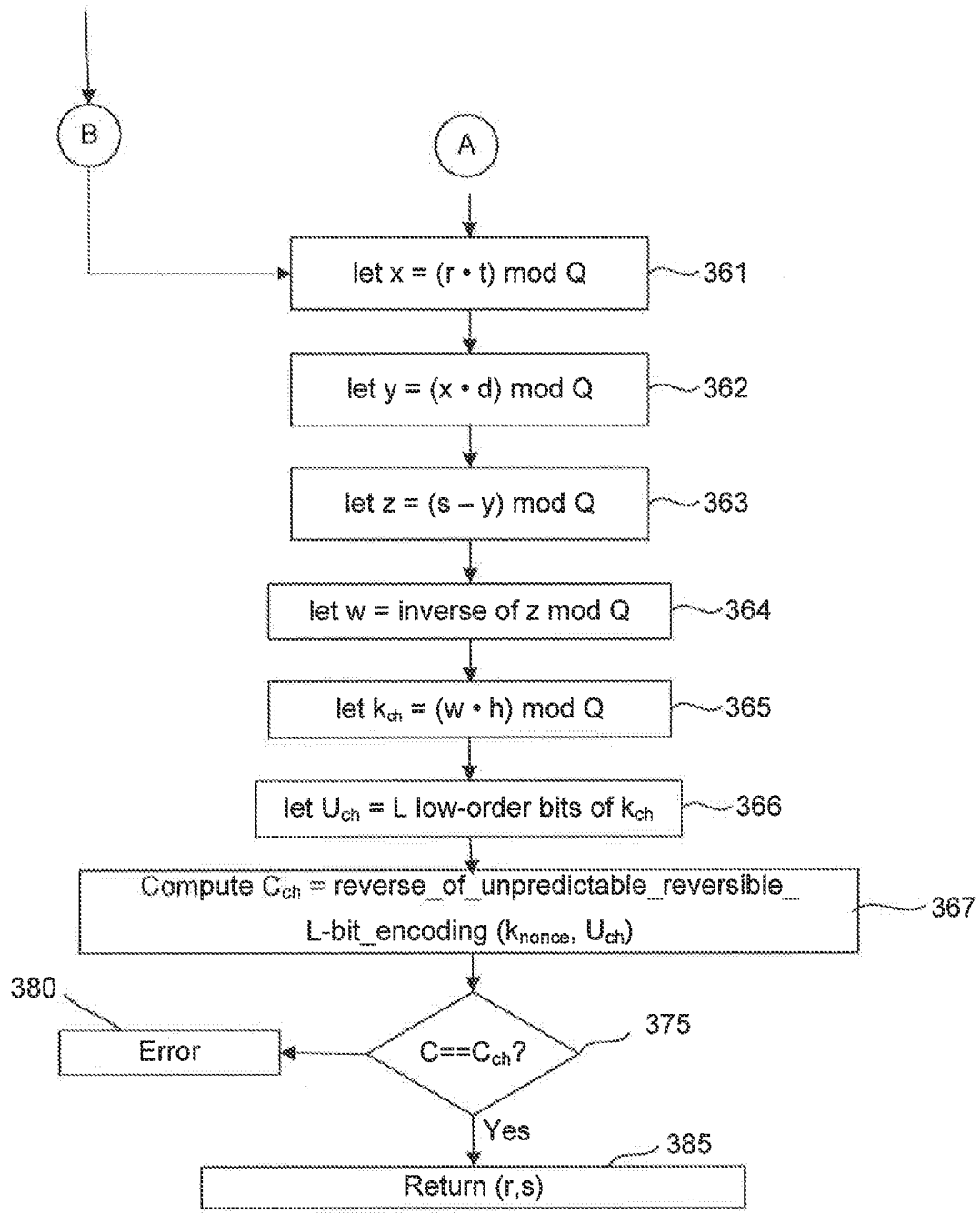

In FIG. 3, even though not shown as in FIGS. 1 and 2, h represents the hash of the message M, H(M), converted to an integer.

If s is zero (step 360), the process returns to step 301 and computes another nonce, k. If s is nonzero (step 360), the digital signature (r, s) is returned (step 385) and may be used.

Counter Verification Process

FIGS. 3A-1 and 3A-2 illustrate another exemplary embodiment in which the glitch-resistant cryptographic signing method of FIG. 3 is combined with a counter verification process. In FIG. 3A-1, steps 301-360 are the same as steps 301-360 of FIG. 3. In FIG. 3A-2, a test is performed wherein a check value is computed for the counter. The check counter value may be computed as follows.

In step 361, x is computed as r times t modulo Q. The value, y, is calculated as x times d modulo Q (step 362), and z is calculated as s–y modulo Q (step 363). The value, w, may be calculated as the inverse of z modulo Q (step 364). The value, w, may be multiplied by the hash of the message, h, modulo Q, to obtain a [recovered] nonce value $k_{ch}$ for use in computing the check value (step 365). Let $U_{ch}$ equal the lower L bits of the recovered nonce value (step 366). In step 367, a recovered counter value, $C_{ch}$, may then be computed by applying an inverse of the "unpredictable_reversible_L-bit_encoding" function that was applied in step (305) using $k_{nonce}$ (which may be the same nonce derivation key used in step 305, or an inverse key, for an asymmetrical function). For example, some embodiments use DES encryption as the function in step 305 and use DES decryption as the function in step 367.

If the counter check value does not equal the original counter value (step 375), an error (or glitch) has occurred or been intentionally introduced. In this case, the process can signify the error by, for example, returning an error code or incrementing a failure counter (step 380). If C is equal to $C_{ch}$, then no glitch has been detected. The digital signature (r, s) may be returned (step 385) and used.

In some embodiments, steps 361-365 of FIG. 3A-2 may be replaced with an alternative method of calculating the check values. For example, in this embodiment, temporary values $T_0$, $T_1$, and $T_2$ may be calculated as follows:

$T_0 = 1/s \bmod Q$ $T_1 = (d*r) \bmod Q$ $T_2 = (T_1 + h) \bmod Q$

And then $k_{ch} = T_2 \cdot T_0 \bmod Q$. Thereafter, to obtain U (the low-order bits) as in step 366, $U_{ch}$ may be calculated as $U_{ch} = k_{ch} \bmod 2^{128}$. As in step 367, $C_{ch}$ may be computed as $C_{ch}$=reverse_of_unpredictable_reversible_L-bit_encoding ($k_{ch}$, $U_{ch}$).

In step 375, $C_{ch}$ may be compared with C (step 375) to confirm that the recomputed value equals the check value. If it does, the digital signature (r, s) may be returned (as in step 385).

Verification after Inverting the Nonce

Figure 3B:
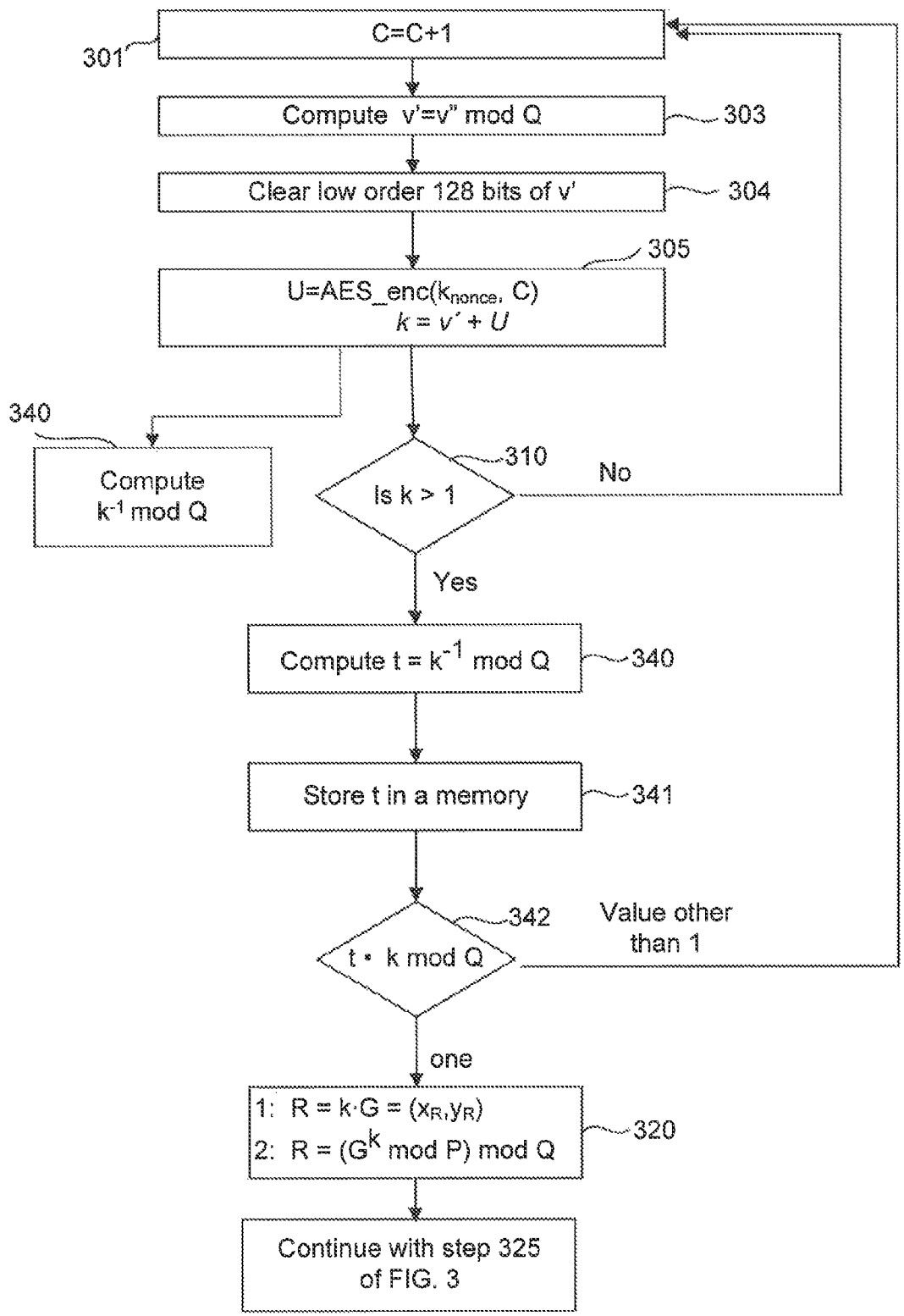
FIG. 3B illustrates another embodiment of the principles disclosed herein in which verification of the nonce occurs after inverting the nonce.

FIG. 3B illustrates another embodiment of the principles disclosed herein. In the process described in FIG. 3B, verification of the nonce occurs after inverting the nonce but before any digital signature parts are calculated. Testing immediately after generation of the nonce may prevent wasted time and computer cycles if a glitch occurred during nonce generation.

In FIG. 3B, steps 301-304 as shown are the same as steps 301-304 of FIG. 3. In step 305 of FIG. 3B, AES encryption is used as an example of an unpredictable_reversible_L-bit_encoding that was shown in step 305 of FIG. 3. In step 310, a test is performed to ensure that k is valid and non-trivial, that is, it is greater than 1.

If k is valid, a temporary variable, t, may be computed as the inverse of the nonce, k, modulo Q (step 340). The value, t, may be stored in memory (step 341). This may be a register, array of gates, set of wires, BUS configuration, or other volatile or non-volatile memory. Next, t*k mod Q may be computed (step 342). If the resulting value is anything other than one, a glitch or error has occurred and been detected; the process updates the counter and computes another nonce k (step 301).

If the value is 1 in step 342, no error (or glitch) has been detected thus far, and the process may continue with step 320 (i.e. calculation of the digital signature parts).

Figure 3C:
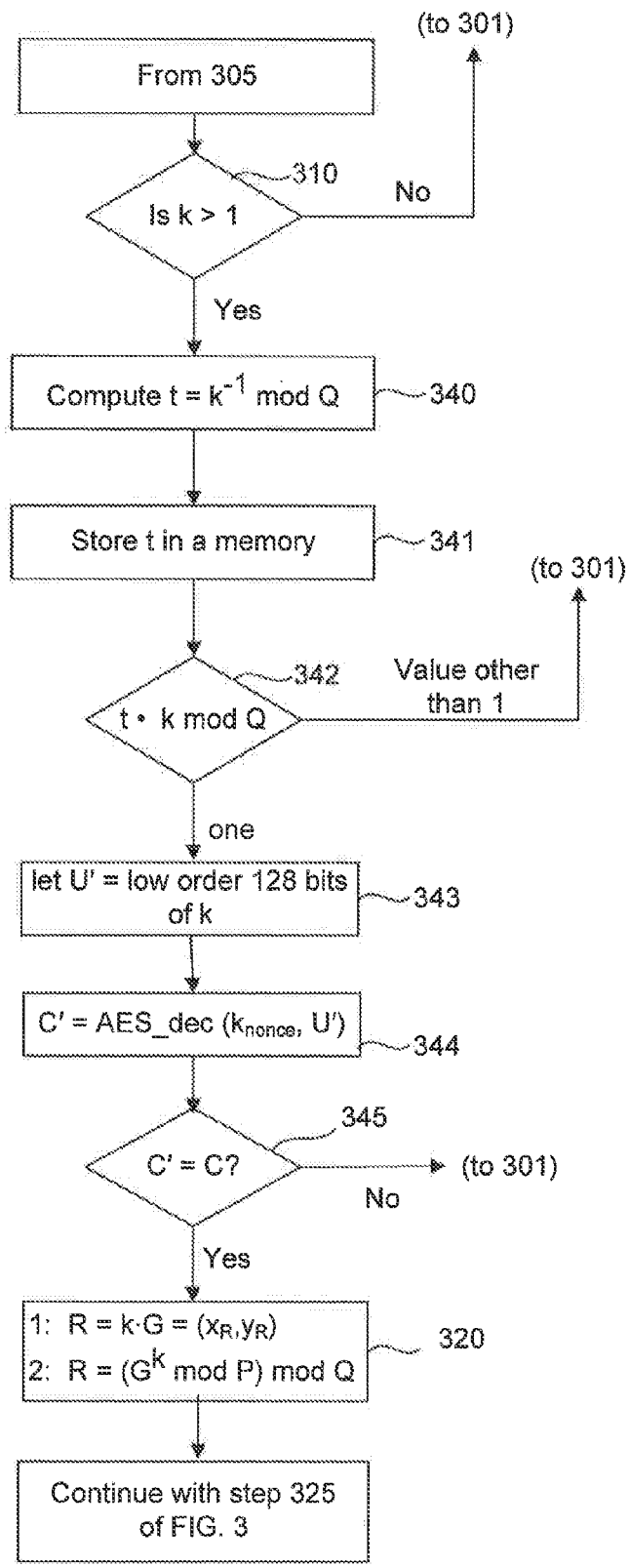
FIG. 3C illustrates a further embodiment where the verification process of FIG. 3B is combined with a counter check value.

FIG. 3C illustrates a further embodiment where the verification process of FIG. 3B is combined with a counter check. In FIG. 3C, steps 310-342 as shown are the same as steps 310-342 of FIG. 3B. The process in FIG. 3C also assumes that the nonce is generated using the process shown in FIG. 3B, that is: U=AES_enc($k_{nonce}$, C) and k=v+U.

After the test is performed in step 342, and it is determined that no error (or glitch) has been detected thus far, the method may calculate a counter check value. In step 343, U' is generated using the lower order 128 bits of k. The counter check value, C', may then be calculated by letting U' equal the low order 128 bits of k and calculating C' as the decrypted value of U' using the same key $k_{nonce}$ as in step 305: C'=AES_dec($k_{nonce}$, U') (step 344). In step 345, if C'==C, then no glitch has been detected, and the process may continue with step 320 (i.e. calculation of the digital signature parts). If the counter check value does not equal the counter, the counter is discarded or updated, and a new nonce k is computed (step 301).

Alternative Embodiments

FIGS. 2-3 show specific embodiments of the principles described herein. However, other methods for generating k may also be used. For example, in some embodiments, the nonce k can be generated using a key-tree generation process such as is described in U.S. Pat. No. 6,539,092 by Paul C. Kocher titled "Leak-Resistant Cryptographic Indexed Key Update."

In other embodiments, the stored state value need not necessarily be a counter, but may be other available internal state information, such as the message itself or information derived from the message by an appropriate cryptographic transformation. So long as the nonce is an unpredictable function of the message, DSA and other schemes are secure even if the same nonce is used when a particular message is signed a second time.

In some embodiments, the counter may be mixed with some variable data to generate the nonce. An intermediate new state may be generated as a hash function of multiple types of stored data, using any suitable cryptographic hash function such as the Secure Hash Algorithm (SHA) family of algorithms (including for example SHA-224, SHA-256, SHA-384, and SHA-512) or any other suitable cryptographic primitive such as, for example a hash function based on a block cipher.

As shown below, an intermediate new state may be generated by applying a hash function (SHA-224 or SHA-256) to a combination of the previous state, the counter, and the key $k_{nonce}$. The new state mod Q may be used as the nonce.

$$state=SHA\text{-}2(state_{prev}, C, k_{nonce})$$

$$k=((state))\bmod Q$$

This method, however, involves maintaining a block of state data that is the size of the hash function's output. This information would need to be stored and, if not adequately protected, may leak information about previous nonces. The output function may involve modular multiplication by another secret constant or XOR with a random variable or multiplication by a nonzero randomly generated number.

In another embodiment, the nonce may be generated by computing a hash of known-variable data, including in some cases a part of the previous signature, r, as shown below:

$$k=(SHA\text{-}2(r_{prev}, C, k_{nonce}))\bmod Q$$

In some embodiments, the nonce may be generated using known-variable data, such as part of the previous signature, mixed with a random variable, V, as computed below:

$$k=(SHA\text{-}2(V_{prev}, C, k_{nonce}) \cdot V)\bmod Q.$$

Mixing known data with new random data to generate a nonce helps thwart an attacker who may discover the $k_{nonce}$ (for example, through DPA), as the attacker will not necessarily be able to get information about the value of any particular nonce. DPA resistance is an important criteria for many devices that perform signature generation. This countermeasure to DPA takes advantage of the fact that the nonces being generated do not have to conform to any particular constant value over time.

Cryptographic Device

Figure 4:
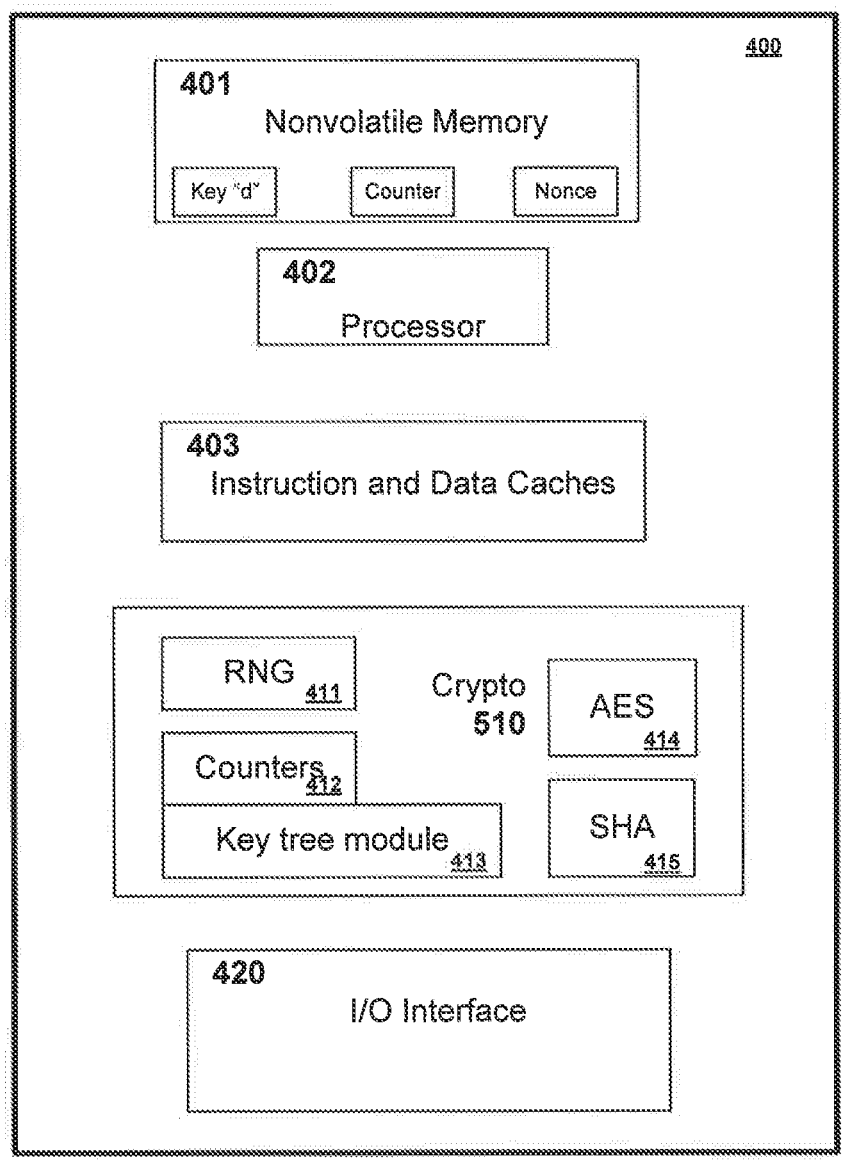
FIG. 4 shows an exemplary device consistent with the principles for glitch-resistant cryptographic signing disclosed herein.

FIG. 4 shows the application of principles described herein embodied in a device (400). For convenience, depending on context, the reference numerals may refer to steps in a process, and/or to quantities used (or produced) by such process steps. As shown in FIG. 4, in at least one embodiment, a device 400 comprises nonvolatile memory 401, at least one processor 402, at least one instruction and data cache 403, cryptographic hardware 410, and an input/output interface 420.

As shown in FIG. 4, NVM 401 may be used to store, for example, one or more of key "d", a counter, or a nonce, as needed to implement the various embodiments described herein.

Processor 402 may be, for example, a high performance multi-core elliptic curve cryptographic processor.

Cache 403 is local memory within the device or chip. For example, cache 403 may be on-chip memory that temporarily stores data or instructions operated on by processor 402.

Crypto 410 may be, for example, hardware, software, or a combination of hardware and software, that performs cryptographic functions. Crypto hardware 410 may comprise, for example, all or some of a random number generator (RNG) 411, one or more counters 412, key tree processing module 412; an AES module 413, and a SHA module 414.

Input/output interface 420 is software or hardware that reads the message or its hash as input and provides the digital signature to other components for further processing.

Methods and systems described herein involve deriving the nonce from a stored value; they also involve updating the value in memory to prevent a counter or sequence from being repeated. Whenever a counter or state is updated, glitches may be introduced. Security of the system may be increased by, for example, using atomic writes. In an atomic write, an existing stored value is not immediately overwritten but instead the updated value is written to a second storage location, and compared with the previously stored value. The comparison may indicate whether the state or counter value has been altered.

It may also be advisable to keep track of the status of a write operation during the updating process such as by using bits or flags to indicate status. For example, when starting a write operation, a flag may be set indicating that the write has begun. When the write has completed, the flag can be cleared. In this way, one can check the status of this flag to determine whether a previous write operation was interrupted. For additional security, and to thwart attackers that can force the bits in a value being written to become all zero or all one, multi-bit values containing both zeros and ones may be used to represent flags. Bits of keys, counters, or other values may also be stored in such a manner. In some cases, the 'all zero' and 'all ones' values may be reserved to indicate errors. (For example, "01" indicates "write pending", "10" indicates write complete/no write pending, and "00" and "11" indicate "invalid state".)

In some embodiments, the nonce may be generated as a function of the message. Generating the nonce from the message is acceptable because the same nonce will only be generated for the same message, therefore this reuse cannot be exploited to gain information about the keys. The nonce, however, must remain secret and be unbiased, which means they should be generated uniform over the modulus. In some embodiments, the message may be converted to an integer and exponentiated by a secret constant modulo that modulus.

The following is an example where the nonce is generated as a deterministic function of the message using a cryptographic function large_blocksize_ENC that produces an output significantly larger than the modulus Q.
So:

$$nonce = (\text{large\_blocksize\_ENC}(k_{nonce}, h)) \bmod Q$$

where ii is the hash of the message to be signed and $k_{nonce}$ is the private nonce-generation key, which may be the same as the DSA signature private key. This encryption process however requires a high-level of DPA security in the large_blocksize_ENC( ) function. This strategy may be suitable for use in, for example, a device that does not have a strong RNG, or one that has low memory size. It does not have the EEPROM requirements of a device using a counter-based strategy. It does, however, require strong DPA countermeasures which may require EEPROM. Examples of large_blocksize_ENC functions include Rijndael, Keccak, and Threefish.

One known glitch attack is a "loop extension" glitch attack, which causes a loop not to terminate, and can cause a loop that is transmitting a few bytes from memory to "extend" and transmit a significant fraction of the device's memory, (This is also called the "memory dump" attack) To protect against these glitch attacks, it may be useful to employ processor-level countermeasures such as clock jitter, voltage flattening and/or randomization. These countermeasures may make it harder to trigger a loop feature to exploit.

In other embodiments, the memory may be encrypted. For example, to further guard against "memory dump" glitches, a secret key algorithm may be built into the device or chip itself (in the circuit, for example, rather than in memory) which is used to decrypt values stored in memory. One strategy for doing so is the CryptoFirewall solution, described in U.S. Pat. No. 6,289,455, title "Method and apparatus for preventing piracy of digital content" by Kocher et al. For example, the digital signature key and nonce-generating key may be stored in memory as input values to the pseudoasymmetric function generator (PAFG). The PAFG output can be provided directly to the input of the circuit for performing the digital signature operation. Alternatively, the PAFG output can be provided directly to a secure bus or set of registers that a memory dump could not access.

Devices that need to be secure against glitch attacks may also need to be secure against differential power analysis (DPA). Therefore, the methods and systems described herein can be implemented using DPA countermeasures. For example, if the counter in any embodiment is a value updated using a linear feedback shift register (LFSR), it may be represented as an exclusive-or of multiple values individually updated using LFSRs, which may increase resistance to DPA attacks. This technique of using LFSRs can be applied independently of glitch resistance countermeasures, and in systems not performing digital signatures, as a general DPA countermeasure.

This patent encompasses a family of related techniques that enable the construction of devices that are significantly more resistant to attack than devices of similar cost and complexity that do not use the techniques disclosed herein. In addition, multiple security techniques might be required to make a system secure; therefore the techniques described herein can be used in conjunction with other security methods or countermeasures.

Furthermore, although the invention has been described with respect to DSA and ECDSA, the inventive principles described herein can be applied to and adapted to other digital signature algorithms, including without limitation ElGamal variants of signature systems, IEEE p1363, PKCS#11, KCDSA, Nyberg-Rueppel, Schnorr, IBE-based signatures (wherein IBE stands for Identity Based Encryption), IBE-based key derivation, pairing-based signature schemes that use nonces, nonce-based lattice signatures, EdDSA 25519, and other cryptographic algorithms involving operations suitable for application of the techniques of this invention.

As those skilled in the art will appreciate, the techniques described above are not limited to particular host environments or form factors. Rather, they can be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications from which related variations, enhancements and modifications will be apparent without departing from the spirit and scope of those particular techniques disclosed herein. Therefore, the invention(s) should not be limited to the foregoing disclosure, but rather construed by the claims appended hereto.

What is claimed is:

1. A computer-implemented method for generating a digital signature involving a secret nonce in a manner that resists glitches, the method to be performed by a system comprising at least one processor and at least one memory, the method comprising:
   generating, using a reversible function, a valid non-zero nonce based on a first secret key and a counter value stored in a first location of the at least one memory;
   updating the counter value and confirming that the first memory location contains the updated counter value;
   generating a digital signature based on the valid non-zero nonce and a second secret key, wherein the second secret key is a private key of a key pair;
   generating an inverse of the valid non-zero nonce;
   generating a check digital signature based on the inverse of the valid non-zero nonce; and
   determining whether the digital signature was generated without a glitch by comparing the generated digital signature with the check digital signature.

2. The method of claim 1, further comprising transmitting the generated digital signature to an external device if the generated digital signature is determined to match the check digital signature.

3. The method of claim 1, wherein the non-zero nonce is used only once and not repeated.

4. The method of claim 1, wherein the step of generating a valid non-zero nonce is resistant to differential power analysis (DPA).

5. The method of claim 1, wherein the nonce is generated using an invertible cryptographic operation.

6. The method of claim 1, wherein the nonce is generated by:
   computing two or more temporary variables as functions of the first secret key and the counter; and
   generating the nonce based on the two or more temporary variables.

7. The method of claim 6, wherein generating the nonce based on the two or more temporary variables comprises combining the two or more temporary variables and reducing the result modulo Q.

8. The method of claim 1, wherein the digital signature comprises a first part and a second part, and the step of generating a check digital signature comprises generating a check value for at least one of the first or second parts and wherein determining whether the digital signature was generated without a glitch comprises comparing the check value for the at least one of the first or second parts with the generated first or second part of the digital signature, respectively.

9. A tamper-proof device for generating a digital signature using an algorithm that uses a secret nonce, the signature being generated in a manner resistant to discovery of a secret by external monitoring of power-consumption variations, the device comprising:
   (a) a source of random or pseudo-random data;
   (b) a memory for storing a first secret key and a counter value;
   (c) a processor for generating the digital signature in a manner decorrelated from externally-monitorable signals produced by said device, by:
      generating, using a reversible function, a valid non-zero nonce based on the first secret key and the counter value,
      updating the counter value and confirming that the first memory location contains the updated counter value,
      generating the digital signature based on the valid non-zero nonce and a second secret key;
      generating an inverse of the valid non-zero nonce;
      generating a check digital signature based on the inverse of the valid non-zero nonce; and
      determining whether the digital signature was generated without a glitch by comparing the generated digital signature with the check digital signature; and
   (d) an output interface for providing said digital signature to an external device.

10. The device of claim 9, further comprising:
    an input/output interface to transmit the generated digital signature to an external device if the generated digital signature is determined to match the check digital signature.

11. The device of claim 9, wherein the non-zero nonce is used only once and not repeated.

12. The device of claim 9, wherein the step of generating a valid non-zero nonce is resistant to differential power analysis (DPA).

13. The device of claim 9, wherein the nonce is generated using an invertible cryptographic operation.

14. The device of claim 9, wherein the nonce is generated by:
    computing two or more temporary variables as functions of the first secret key and the counter; and
    generating the nonce based on the two or more temporary variables.

15. The device of claim 14, wherein generating the nonce based on the two or more temporary variables comprises combining the two or more temporary variables and reducing the result modulo Q.

16. The device of claim 9, wherein the digital signature comprises a first part and a second part, and the step of generating a check digital signature comprises generating a check value for at least one of the first or second parts and wherein determining whether the digital signature was generated without a glitch comprises comparing the check value for the at least one of the first or second parts with the generated first or second part of the digital signature, respectively.

17. The method as in any one of claims 1 or 3-10, wherein the digital signature is generated in a manner that is resistant to differential power analysis (DPA).

* * * * *